US009953377B2

(12) United States Patent
Lymberopoulos et al.

(10) Patent No.: US 9,953,377 B2
(45) Date of Patent: Apr. 24, 2018

(54) CUSTOMIZED MEDIA

(71) Applicant: Microsoft Technology Licensing, LLC, Redmond, WA (US)

(72) Inventors: Dimitrios Lymberopoulos, Redmond, WA (US); Jie Liu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 14/548,202

(22) Filed: Nov. 19, 2014

(65) Prior Publication Data
US 2016/0140227 A1 May 19, 2016

(51) Int. Cl.
G06Q 50/00 (2012.01)
G06F 17/30 (2006.01)

(52) U.S. Cl.
CPC ....... G06Q 50/00 (2013.01); G06F 17/30761 (2013.01)

(58) Field of Classification Search
CPC .................. G06F 17/30761; G06Q 50/00
See application file for complete search history.

(56) References Cited

U.S. PATENT DOCUMENTS

| | | | |
|---|---|---|---|
| 6,748,395 B1 * | 6/2004 | Picker | G06Q 30/0209 |
| 8,661,151 B2 | 2/2014 | Sharkey | |
| 9,226,072 B2 * | 12/2015 | Bender | H04R 5/04 |
| 2007/0073596 A1 * | 3/2007 | Alexander | G06Q 30/02 705/26.1 |
| 2007/0233743 A1 * | 10/2007 | Rosenberg | G06F 17/30017 |
| 2008/0091717 A1 | 4/2008 | Garbow et al. | |
| 2009/0299960 A1 | 12/2009 | Lineberger | |
| 2012/0023403 A1 * | 1/2012 | Herberger | G06F 17/30743 715/716 |
| 2012/0060176 A1 * | 3/2012 | Chai | H04H 60/45 725/10 |
| 2013/0091054 A1 | 4/2013 | Nathan et al. | |
| 2013/0268593 A1 | 10/2013 | Parekh | |
| 2013/0347022 A1 * | 12/2013 | Bates | H04N 21/25816 725/25 |
| 2014/0188920 A1 * | 7/2014 | Sharma | G06F 17/30775 707/758 |
| 2014/0237361 A1 * | 8/2014 | Martin | G11B 27/105 715/716 |
| 2014/0358898 A1 * | 12/2014 | Lehtiniemi | G06F 17/30053 707/722 |
| 2015/0149585 A1 * | 5/2015 | Zhang | G06Q 10/10 709/217 |

OTHER PUBLICATIONS

Crossen, et al., "Promoting Social Interaction in Public Spaces: The Flytrap Active Environment", In Consuming Music Together: Social and Collaborative Aspects of Music Consumption Technologies, vol. 35, Aug. 26, 2013, pp. 1-18.

(Continued)

Primary Examiner — Jay A Morrison
(74) Attorney, Agent, or Firm — Rainier Patents, P.S.

(57) ABSTRACT

The discussion relates to visitor-driven, venue-specific media. One implementation can obtain a venue media profile of a venue and obtain visitor profiles of visitors at the venue. This implementation can generate a playlist of visitor-driven, venue specific media based on both the venue media profile and the visitor profiles.

20 Claims, 7 Drawing Sheets

(56) References Cited

OTHER PUBLICATIONS

Hull, Derrek J., "Roqbot Music App Turns Customers into Their Own DJs", Published on: Jan. 28, 2013 Available at: http://nrashow.typepad.com/flooredblog2010/2013/01/roqbot-music-app-turns-customers-into-their-own-djs.html.

Mooij, et al., "Learning Preferences for Music Playlists", In Technical Note PR-TN 2003/00735, Jun. 2, 2014 Available at: http://citeseerx.ist.psu.edu/viewdoc/download?doi=10.1.1.72.1691&rep=rep1&type=pdf.

Liu, et al., "BingNow 2.0: Real-Time Business Metadata Extraction", Published on: Mar. 28, 2013 Available at: http://research.microsoft.com/en-us/projects/bingnow2.0/.

Schedl, et al., "Mobile Music Genius: Reggae at the Beach, Metal on a Friday Night?", In Proceedings of International Conference on Multimedia Retrieval, Apr. 2014, 4 pages.

Hu, Yajie, "A Model-Based Music Recommendation System for Individual Users and Implicit User Groups", In Open Access Dissertations, May 5, 2014, 116 pages.

"Music Discovery and Personalization", Published on: Oct. 27, 2013 Available at: http://echonest.com/solutions/musicdiscovery/.

Sawers, Paul, "Senzari Launches Wahwah for iOS, a Social Music-Streaming App with a Focus on Activities and Location", Published on: Mar. 8, 2013 Available at: http://thenextweb.com/apps/2013/03/08/senzari-launches-wahwah-for-ios-a-social-music-streaming-app-with-a-focus-on-activities-and-location/.

\* cited by examiner

METHOD 500

CUSTOMIZED MEDIA

BACKGROUND

A venue may wish to create an ambience to enhance an experience of visitors while the visitors are at the venue. For example, the venue, such as a restaurant or shop, can play music and/or video (e.g., media) to improve the visitor experience. Playing music or video that the visitors enjoy can make the visitors feel more comfortable and connected to the venue, and potentially increase visitor spending and/or increase re-visitation by the visitors. However, playing music or video that the visitors do not like can annoy the visitors, cause them to leave, and/or cause them to be less likely to revisit the venue. Therefore, selection of media to offer at the venue is important.

SUMMARY

The discussion relates to visitor-driven, venue-specific media. One implementation can obtain a venue media profile of a venue and obtain visitor profiles of visitors at the venue. This implementation can generate a playlist of visitor-driven, venue specific media based on both the venue media profile and the visitor profiles.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases parentheticals are utilized after a reference number to distinguish like elements. Use of the reference number without the associated parenthetical is generic to the element. Further, the left-most numeral of each reference number conveys the figure and associated discussion where the reference number is first introduced.

DETAILED DESCRIPTION

Overview

The experience of visitors at a venue (e.g., a business) can be enhanced by tailoring media (e.g., music, video) to media preferences of the visitors at the venue. In particular, the tailored media can be automatically updated in real-time as individual visitors come and go from the venue. The media can also be tailored to comply with a venue media profile (e.g., preferences, restrictions) established by the venue. Tailoring of the media is therefore driven by the visitors at the venue as well as the venue itself. Thus, the tailored media can be called visitor-driven, venue-specific media (VD-VSM). The VDVSM can be presented (e.g., played, shown, streamed) at the venue to personalize and therefore enhance the visitors' experience at the venue.

In the present implementations, the VDVSM can be generated by a VDVSM service. The venue can provide the VDVSM service with the venue media profile to ensure content appropriate to the venue is selected for the VDVSM. For example, the venue can choose a genre of music to be allowed in the VDVSM, or establish a "do not play" list with the VDVSM service. Additionally, locations of people that might visit the venue can be determined. When the locations indicate that the people have arrived at the venue, the people can be considered visitors at the venue (e.g., customers at a business). Media preferences of the visitors at the venue can be obtained. The VDVSM service can tailor the VDVSM by balancing the venue media profile and the media preferences of the visitors. Furthermore, current locations of the visitors can be updated as individual visitors arrive at the venue and/or depart in real-time. Thus, the VDVSM presented at the venue can be tailored to the media preferences of the visitors that are currently at the venue, enhancing the visitors' experience.

Scenario Example

Figure 1:
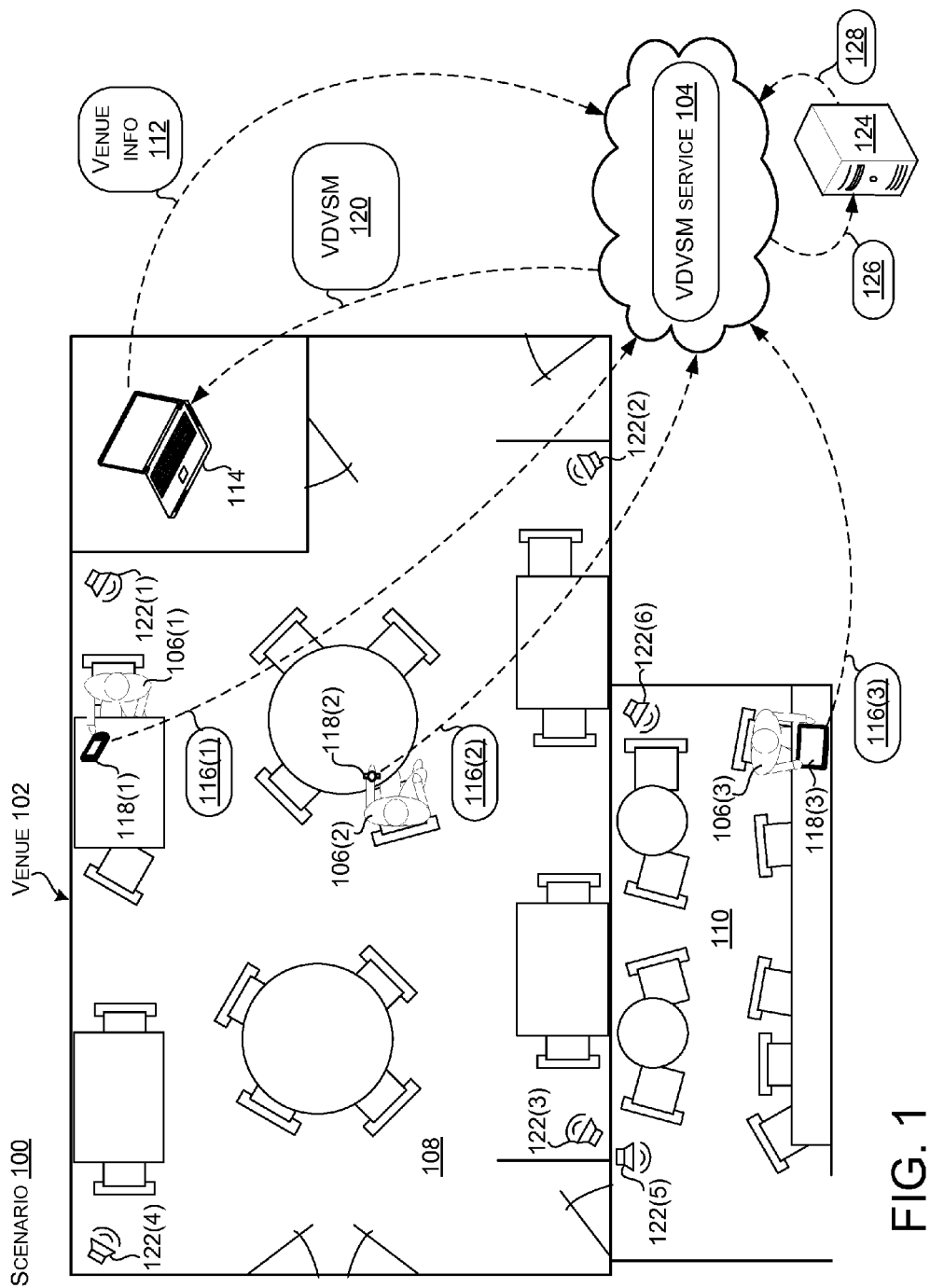
FIG. 1 shows an example scenario for visitor-driven, venue-specific media concepts in accordance with some implementations.

FIG. 1 shows an example scenario 100 for enhancing visitor experience through visitor-driven, venue-specific media (VDVSM). Scenario 100 includes a venue 102. Scenario 100 also includes a VDVSM service 104. In some implementations, the venue can subscribe to the VDVSM service for the purpose of enhancing the visitor experience at the venue. For purposes of illustration, visitors 106 are at the venue in scenario 100. As shown in FIG. 1, three visitors 106(1), 106(2), and 106(3) are currently at the venue. Of course, more visitors or fewer visitors can be at the venue as the visitors come and go.

In general, a venue can be any of a variety of places that people might visit. For example, the venue can be a business. In some cases, the business can be a restaurant, a bar, a club, a shop, or a gym. The venue can also be a place where people gather, such as a mall, a pavilion, or a park. The venue can also be a place where people pass through or wait, such as a bus station, a subway station, or an airport. Various types of venues are contemplated. Furthermore, the venue can include multiple areas. The venue may wish to create different ambiences in the multiple areas. For example, the venue can include a relatively quiet dining area and a relatively lively bar area. In the example shown in FIG. 1, venue 102 is a café that includes an inside area 108 and an outside area 110.

In some implementations, the venue 102 can communicate venue information 112 to the VDVSM service 104. For example, as shown in FIG. 1, the venue can use a computer 114 (e.g., computing device) to interface with the VDVSM service. In some implementations, the venue information can include the venue media profile and/or other communications. The venue media profile can include information, such as specifications regarding the type of media to be played at the venue. For example, the venue media profile can include one or more genres of music to be played in the inside area 108 and/or the outside area 110. In another example, the venue media profile can specify a genre(s) of music to exclude, such as music that would be inappropriate for the atmosphere of the venue. In another example, the venue media profile can include a "do not play" list, which can name specific songs that are not to be played at the venue. In yet another example, the venue media profile can include a prepackaged media profile which can be selected by the venue as opposed to defining or building the venue media profile. Additionally or alternatively, the prepackaged media profile could be used as a base (e.g., starting point) for the venue media profile, and could be further amended by the venue. For instance, the venue could select the prepackaged media profile, and additionally specify certain media content for a "do not play" list. An example venue media profile is shown and described relative to FIG. 4, below.

Venue information 112 can also include communications from venue 102 to the VDVSM service 104 (e.g., from computer 114 to the VDVSM service). For example, the venue may wish to interrupt current streaming of the VDVSM. In this example, the venue can send a communication to the VDVSM service to skip to a next song in a playlist of the VDVSM. In other examples, a communication can include a command to switch to a different playlist of the VDVSM, initiate a special event playlist of the VDVSM, or block information and/or participation from a particular visitor.

In some implementations, the VDVSM service 104 can receive visitor information 116 from the visitors 106. For example, as shown in FIG. 1, the visitor information can be sent to the VDVSM service through devices 118 associated with the visitors 106. In this example, visitor 106(1) is associated with device 118(1), which can be a smart phone type device. Visitor 106(2) is associated with device 118(2), which can be a wearable device, such as a smart watch. Visitor 106(3) is associated with device 118(3), which can be a tablet type device. In other examples, devices can include traditional computing devices, such as personal computers, cell phones, smart phones, personal digital assistants, or any of a myriad of ever-evolving or yet to be developed types of computing devices, including combinations of devices. In some implementations the visitor information can be sent to the VDVSM service as the visitors enter the venue. For example, as visitor 106(1) arrives at the venue, visitor information 116(1) can be sent from device 118(1) to the VDVSM service. Additionally or alternatively, the visitor information can be continually or repeatedly sent to the VDVSM service (e.g., the visitor information can be updated).

Visitor information 116 can include location information, media preferences, current selections, and/or other information relevant to visitors 106. The location information can include locations (e.g., GPS, Wi-Fi) of devices 118 associated with the visitors. For example, a sensed location of device 118(1) proximate (e.g., within, nearby) the venue can indicate that visitor 106(1) is at venue 102. The location information can also include identification information associated with the venue, such as a business name and/or address. The identification information of the venue can also include information identifying an account of the venue with the VDVSM service 104. The customer identifications can include information that identifies individual visitors, such as accounts of the individual visitors with the VDVSM service.

The media preferences can include music genres, artists, media content, preferred broadcasting stations, and/or other preferences of the visitors 106. The media preferences can indicate media content found on an individual device 118 of an individual visitor and/or media content associated with an account of the individual visitor at the VDVSM service 104, among others. The media preferences can include media profiles/settings that may have been designed or edited by the visitors. The media preferences can also include media content, settings, and/or preferences that are in addition to, or reside outside of a context of the VDVSM service, such as other media services or online accounts. The media preferences can also include ancillary information, such as a sports team(s) of interest to the visitors. Such ancillary information can suggest preferred media content, such as a television station currently playing a game that features the sports team(s) of interest. The media preferences can also include current selections, such as media content currently being accessed by the visitors. For example, the current selections can include a song to which an individual visitor is currently listening using their device. The current selections can also include media content accessed most recently and/or most often by the visitors. In another example, the current selections can be linked to a time of day or day of the week, such as what media content or type of media content the visitors tend to access at a particular time of day. In summary, media preferences can include specific media, types of media, how often and/or when media is played, etc. Example media preferences are shown and described relative to FIG. 4, below.

VDVSM service 104 can use venue information 112 and visitor information 116 to create VDVSM 120. For example, the VDVSM service can use the venue media profile of the venue information to select a genre of music for the VDVSM. Also, the VDVSM service can use the media preferences of the visitor information from current visitors 106 as a guide to specify a certain subset of the genre of music for the VDVSM. In some implementations, the VDVSM service can use the media preferences, the current selections, the ancillary information, and/or other visitor information to select individual songs to be added to a playlist of the VDVSM, to update the playlist, and/or to arrange an order of the playlist in real-time. The VDVSM service can also design and/or update the playlist of the VDVSM playlist according to other inputs, such as the communications from venue 102. For example, the venue can request a live change in the VDVSM via the communications, such as to interrupt/cancel a certain song. More detail regarding the generation of the VDVSM will be provided relative to FIG. 4 below.

As illustrated in FIG. 1, the VDVSM 120 can be sent from VDVSM service 104 to venue 102, such as to computer 114. In some implementations, the VDVSM can be sent, such as by streaming, to computer 114 and/or the playlist of the VDVSM can be sent to computer 114 among other options. Composition and delivery of the VDVSM will be described in more detail relative to FIG. 2 below. In scenario 100, the VDVSM can be played at the venue using sound system speakers 122 of the venue. The sound system speakers can be hardwired or connected wirelessly to the computer. In other examples, the VDVSM can be played, shown, and/or otherwise presented over a variety of equipment, such as speakers, monitors, displays, etc.

As noted above, in the example shown in FIG. 1 venue 102 is a café with an inside area 108 and an outside area 110. In this example, the venue media profile can include media specifications for both the inside area and the outside area. For instance, the venue may specify calm dining for the inside area, with calm music to be played through speakers 122(1)-122(4). Simultaneously, the outside area can be intended as a bar area for socializing, and the venue may specify more lively music for the outside area, to be played through speakers 122(5) and 122(6). The VDVSM service 104 can tailor a first playlist of the VDVSM 120 to the venue media profile and the media preferences for the visitors currently present in the inside area (e.g., visitors 106(1) and 106(2)), and tailor a second playlist of the VDVSM to the venue media profile and the media preferences for the visitors currently present in the outside area (e.g., visitor 106(3)). As such, the VDVSM can include multiple playlists for the venue.

To summarize, venue 102 can subscribe to the VDVSM service 104. The VDVSM service can provide real-time, tailored VDVSM 120 for the venue. The VDVSM can be customized to the media preferences of the visitors 106 currently at the venue while aiming to provide a desired ambience of the venue. As such, the visitors' experience is enhanced.

In the example shown in FIG. 1, scenario 100 can also include a media industry entity 124 (represented in FIG. 1 as a computer). The media industry entity can be a record label, an artist, or a broadcasting corporation, among others. The media industry entity may wish to incentivize or otherwise influence VDVSM service 104 to include new media content in the VDVSM 120 that is tailored to the media preferences of visitors 106 currently at venue 102. For example, the media industry entity can be a record label that would like to introduce new media content to the visitors, so that the visitors may choose to purchase the new media content. Furthermore, the visitors may be more likely to consider purchasing the new media content if it is aligned with the media preferences of the visitors. In some implementations, an arrangement between the media industry entity and the VDVSM service can help improve the experience of the visitors at the venue by including fresh, contemporary media content (e.g., cool new music) in the VDVSM that is tailored to the visitors' media preferences.

In some implementations, for media industry entity 124 to introduce appropriate new media content through the VDVSM 120, VDVSM service 104 can exchange information with the media industry entity. For example, the VDVSM service can send information 126 to the media industry entity. Information 126 can include elements of venue information 112 and visitor information 116. For example, information 126 may include the venue media profile, the media preferences of the visitors currently at the venue, an amount of time/space available to the media industry entity with respect to the VDVSM, cost/price information regarding time/space in the VDVSM, and/or other information. (Note that this can be accomplished in an anonymous manner that protects the privacy of the visitors 106). In this example, the media industry entity can send a request 128 (e.g., bid) to the VDVSM service. The request can be for the VDVSM service to include the appropriate new media content in the VDVSM in exchange for an incentive. The appropriate new media content can be tailored based on information 126 (e.g., aligned with the media preferences of the visitors and the venue 102). In some implementations, the request can include an offer of payment (e.g., a bid) in exchange for a slot for including the appropriate new media content in the VDVSM. In some cases, the request can also include sending the appropriate new media content offered by the media industry entity. In this manner, the arrangement between the media industry entity and the VDVSM service can help the venue enjoy new music from the media industry entity without the venue having to worry about licensing fees for new media content.

To summarize, VDVSM service 104 can help venue 102 provide an enjoyable, personalized experience for visitors 106 with minimal time and/or resources spent by the venue. Many venues already have internet connectivity and audio equipment deployed. This equipment may be used by the present implementations to provide media that is customized to both the visitors and the venue. The VDVSM service can provide real-time VDVSM content that is preapproved by the venue and specifically tailored to the visitors that are currently at the venue. Personalization of the visitors' experience through the real-time VDVSM content can potentially benefit the venue in various ways, such as with repeat visits, increased length of visits, and/or increased spending by visitors.

System Example

Figure 2:
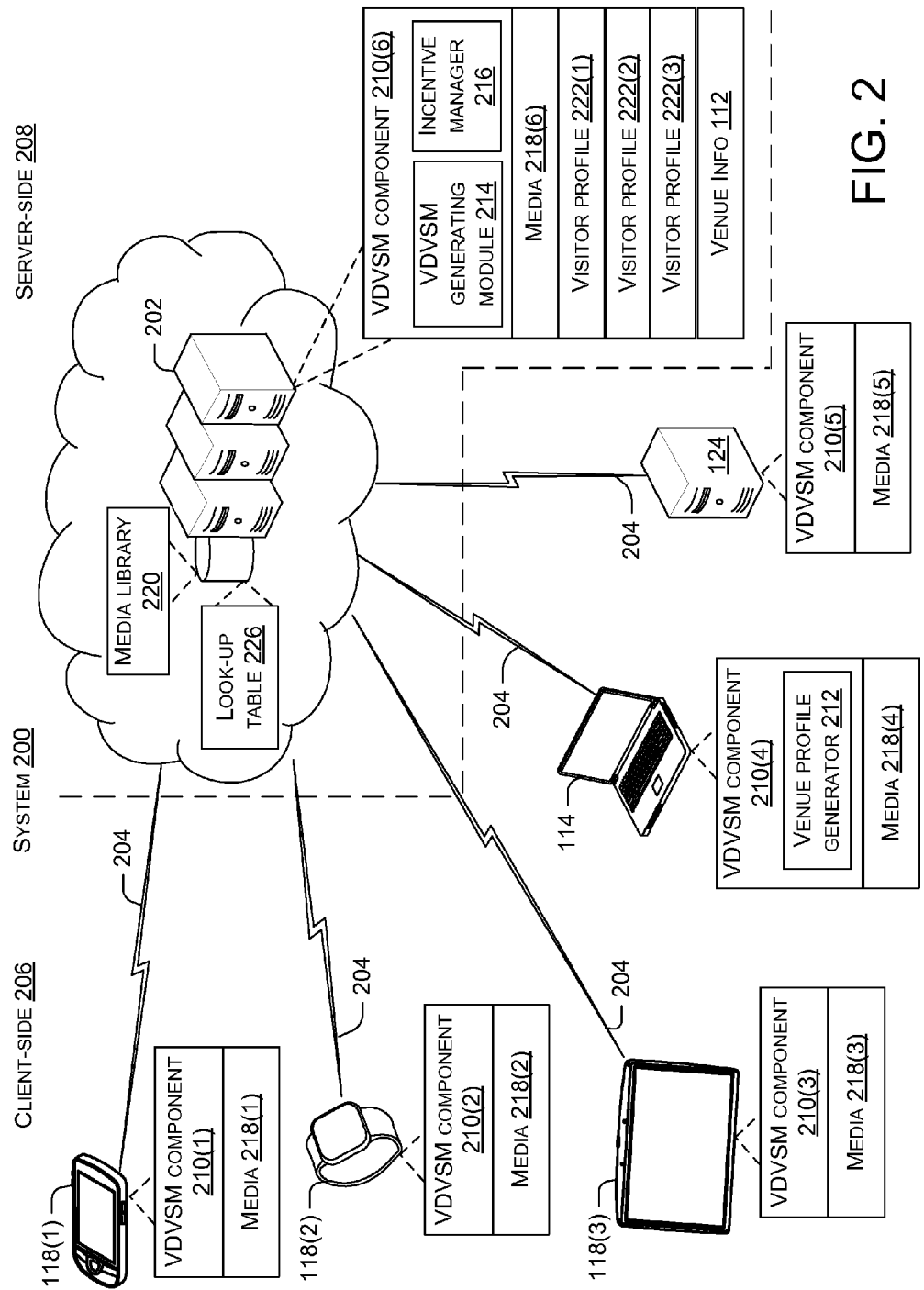
FIGS. 2-3 show an example system in accordance with some implementations of the present concepts.

FIG. 2 shows a system 200 that can accomplish visitor-driven, venue-specific media (VDVSM) concepts. For purposes of explanation, system 200 includes devices 118(1), 118(2), and 118(3); computer 114; and media industry entity 124 (see FIG. 1), which can communicate with another device 202. The number of illustrated devices is, of course, intended to be representative and non-limiting. Devices 118, computer 114, and/or the media industry entity can communicate with device 202 via one or more networks (represented by lightning bolts 204). In some cases parentheticals are utilized after a reference number to distinguish like elements. Use of the reference number without the associated parenthetical is generic to the element.

For purposes of explanation, devices 118, computer 114, and/or the media industry entity 124 can be thought of as operating on a client-side 206 (e.g., they are client-side devices). Device 202 can be thought of as operating on a server-side 208 (e.g., it is a server side device, such as in a datacenter or server farm). The server-side device can provide various remote functionalities, such as generating VDVSM 120 (see FIG. 1) or retrieving media files, for the client-side devices. This client/server distinction may be absent in other implementations, such as when the described elements are maintained locally to the venue, or in peer-to-peer configurations, among others.

In this implementation, devices 118, computer 114, the media industry entity 124, and/or device 202 can include an instance of a VDVSM component 210. The VDVSM components can achieve specific facets of VDVSM service 104 (described relative to FIG. 1). Further, the VDVSM components 210 can operate in a stand-alone manner or in a distributed manner. For example, VDVSM component 210(6) can operate in a stand-alone manner to provide VDVSM service 104. In another example, VDVSM components 210(4) and 210(6) can operate in a distributed manner. The example shown in FIG. 2 is only one possible configuration and other implementations may include VDVSM component 210(4) associated with computer 114 and the server-side VDVSM component 210(6), but eliminate the client-side VDVSM components 210(1)-210(3) and 210(5), for example. In the illustrated configuration, VDVSM component 210(4) can include a venue profile generator 212. VDVSM component 210(6) can include a VDVSM generating module 214 and an incentive manager 216.

As shown in the example in FIG. 2, devices 118, computer 114, media industry entity 124, and/or device 202 can also include media 218. Device 202 can also include a media library 220 and/or access a remote media library. The system 200 may also maintain visitor profiles 222 for the visitors associated with devices 118(1)-118(3). In this example, the visitor profiles 222 are maintained on server-side device 202. (The visitor profile(s) could alternatively or additionally be maintained on client-side devices and/or some other server-side device). Visitor profile 222(1) corresponds to the visitor associated with device 118(1), visitor profile 222(2) corresponds to the visitor associated with device 118(2), and so on. The visitor profile can contain information about what type of media the visitor is interested in (e.g., music, sports, news, etc.), when the visitor tends to access that media, how often they access individual media and/or in what context (e.g., at home or at a coffee shop for example), social network information (e.g., social network identifier and list of close friends with related identifiers), whether the visitor has accessed media recently or currently, etc.

The system 200 can also maintain venue information 112 on server-side device 202. The venue information can include information such as billing information, account number, etc. that is not discussed in more detail. The venue information can also contain the venue media profile (e.g., information relating to or otherwise germane to media selection) discussed above relative to FIG. 1. (An example venue media profile is illustrated and described below relative to FIG. 4). Initially, such as when venue 102 opens for the day, VDVSM service 104 can provide media consistent with the venue information. As visitors 106 arrive, the VDVSM service can update the media to the VDVSM 120 that considers both the visitors and the venue.

In some implementations, VDVSM component 210 can determine (e.g., recognize) that visitor 106 has arrived at venue 102. The determination that the visitor has arrived at the venue can be made in several ways. For example, the VDVSM component can obtain a location of device 118 associated with the visitor and determine that the location is also the location of the venue (e.g., geo-fencing technology). In this example, the location of the device can be obtained from embedded location services (e.g., GPS, Wi-Fi) on the device that can sense the location of the device. In another example, the VDVSM component can determine that the visitor has logged on to a local network of the venue using the device (e.g., Wi-Fi). In this example, the VDVSM component can obtain identification of the visitor via the login procedure. In another example, a third party can provide information indicating that the visitor has arrived at the venue. For instance, a provider of cellular service to the device of the visitor can provide information to the VDVSM component indicating that the device is proximate to the location of the venue. Other ways to obtain location information of the visitor are contemplated, such as triangulation (e.g., Wi-Fi triangulation, cellular signal triangulation), the visitor providing/announcing their location, etc.

In some implementations, VDVSM component 210 can use a look-up table 226 to help determine that visitor 106 has arrived at venue 102. For example, the look-up table can include location information for multiple venues, including venue 102. In one case, in response to obtaining the location of device 118, the VDVSM component can use the look-up table to identify venue 102 as being associated with that location. Identification of the venue associated with the location can also include a business name, address, and/or account (e.g., online account) of the venue. Additionally or alternatively, the VDVSM component can identify a venue, use the look-up table to find the location of the venue, then determine which visitors are at that location (e.g., at the venue).

In response to determining that visitor 106 has arrived at venue 102, system 200 can automatically trigger the sending of visitor information 116 to VDVSM component 210(6). For example, visitor 106(1) can configure settings of VDVSM component 210(1) to allow automatic sending of visitor information 116(1) upon arrival of visitor 106(1) at an individual venue. In other cases, the VDVSM component 210(1) can ask for confirmation and/or permission from the visitor before sending information. For example, the visitor can configure settings of VDVSM component 210(1) to check with the visitor before sending the visitor information. In some implementations, VDVSM components 210(1), 210(2), and/or 210(3) can represent an application available for visitors 106 on devices 118. The application can include an interface(s) for the visitors to interact with the VDVSM service 104, such as to configure the settings of the VDVSM component. The application can enable various other interactions between the visitors and the VDVSM service, such as allowing the visitors to provide feedback on media currently being presented (e.g., entering "like" for a currently playing song).

Note that the visitors' privacy can be protected while implementing the present concepts by only collecting visitor information 116 upon the visitor 106 giving his/her express consent. All privacy and security procedures can be implemented to safeguard the visitor. For instance, the visitor may provide an authorization (and/or define the conditions of the authorization) on his/her device 118 or account. Otherwise, visitor information is not gathered and functionalities can be offered to the visitor that do not utilize the visitor's personal information. Even when the visitor has given express consent the present implementations can offer advantages to the visitor while protecting the visitor's personal information, privacy, and security and limiting the scope of the use to the conditions of the authorization.

Referring again to FIG. 2, VDVSM component 210(4) can allow the venue 102 (e.g., a business owner at the venue) to configure (e.g., enter) venue information 112 (described above relative to FIG. 1). For example, the venue profile generator 212 of the VDVSM component 210(4) can be configured to generate a graphical user interface on computer 114. The graphical user interface can allow selection and/or input of the venue information. Through this interface, the venue can identify specific music genres, artists, or even songs that are allowed to be played in the venue. At the same time, the venue can exclude specific songs, artists, or music genres from being played in the venue. The venue profile generator can also enable filtering of media by time of day, creation of special events (e.g., advertised special events, private parties), selection of a prepackaged media profile, and/or selection of preferred media "channels" or "stations." The venue profile generator can allow the venue to block input from certain visitors, and/or create visitor "VIP" clubs (e.g., VIP visitors' preferred media is given preferential treatment). For example, the input from VIP visitors can be weighted more than input from other visitors.

In some implementations, the VDVSM component 210 can create and/or allow visitor-specific and venue-specific advertisements and/or messages. Additionally or alternatively, the VDVSM component can allow the venue to specify whether other approved advertisements and/or messages, such as from venue partners, may be presented. In other cases, the system 200 can offer media presentation without advertisements.

In some implementations, referring collectively to FIGS. 1 and 2, VDVSM component 210(5) can receive information 126. VDVSM component 210(5) can present information 126 to the media industry entity 124 in a manner that allows the media industry entity to select appropriate media to associate with request 128. In some cases, VDVSM component 210(5) can present a graphical user interface through which the media industry entity can place the request. For example, through VDVSM component 210(5), the media industry entity can request a number of slots or an amount of time relative to VDVSM 120 based on information 126. In some implementations, VDVSM component 210(5) can be considered to include a bidding engine. Incentive manager 216 on device 202 can receive request 128 from VDVSM component 210(5).

VDVSM generating module 214 of VDVSM component 210(6) can generate the VDVSM 120. For example, the VDVSM generating module can use any of the venue information 112, the visitor information 116, and/or request 128 in designing the VDVSM (as discussed above relative to FIG. 1). Examples of techniques for generating the VDVSM that can be employed by the VDVSM generating module will be described in more detail relative to FIG. 4 below.

Continuing with FIG. 2, VDVSM components 210 can present and/or deliver the VDVSM 120 at venue 102 in a variety of ways. In one example, VDVSM component 210(6) can stream the VDVSM to the venue. For instance, VDVSM component 210(6) can stream content of the VDVSM from media library 220 to VDVSM component 210(4). The media library can contain media (e.g., songs, videos) that can be selected in accordance with the VDVSM. For example, songs named in a playlist of the VDVSM can be selected from the media library. In some cases, VDVSM service 104 can include access to available sources of media, such as audio and/or visual broadcasts. For example, VDVSM component 210(6) can access audio and/or visual broadcasts to present (e.g., stream) to VDVSM component 210(4) as prescribed by the playlist of the VDVSM. In some implementations, VDVSM component 210(4) can present the streaming content of the VDVSM at the venue, such as over sound system speakers 122 (see FIG. 1) and/or on video equipment (not shown).

Figure 3:
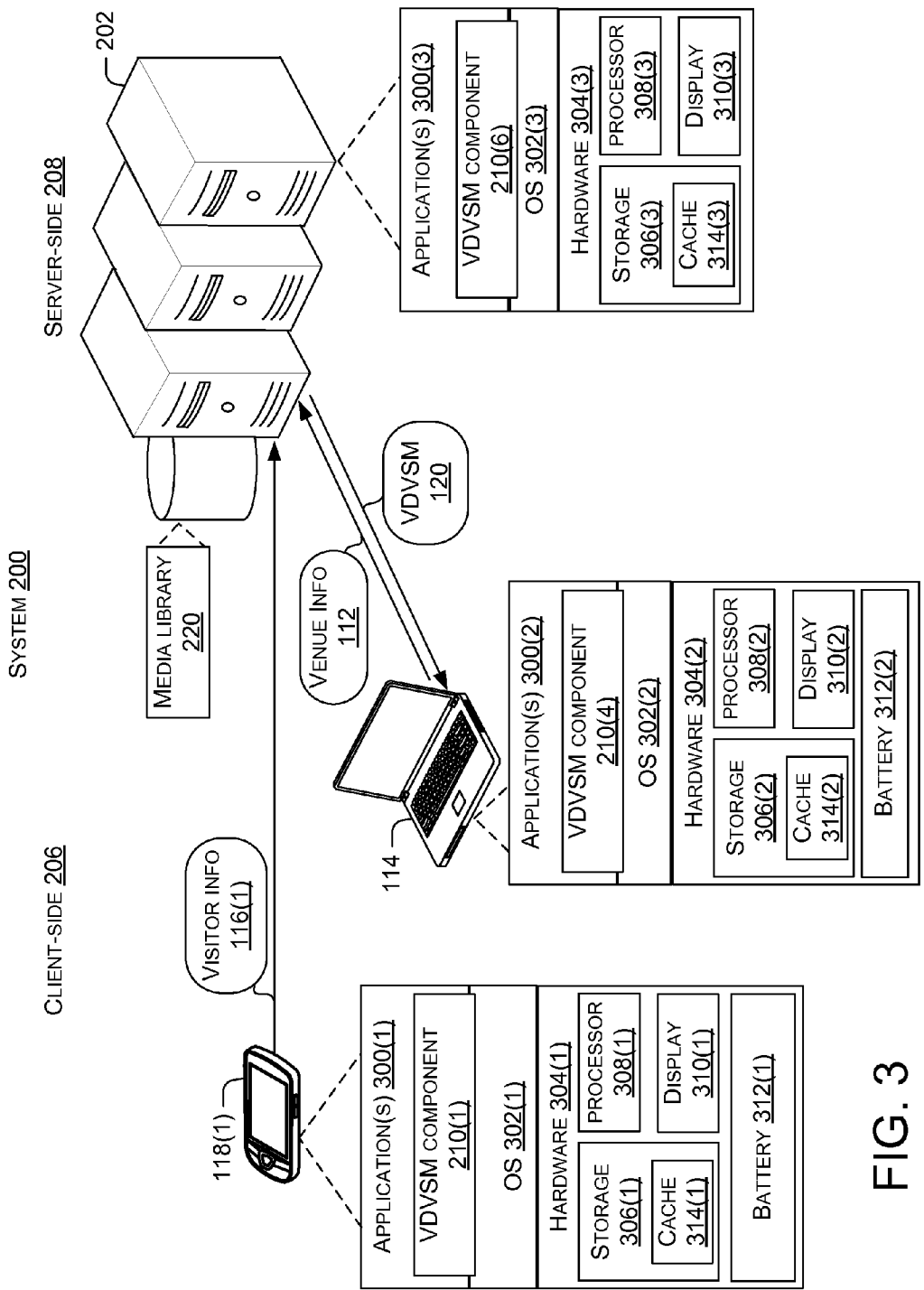

FIG. 3 shows additional details of system 200 relating to components of client-side device 118(1) (representative of devices 118(1)-118(3)) and computer 114, as well as server-side device 202. As shown in FIG. 3, devices 118(1), 114, and 202 can support an application layer 300 running on an operating system (OS) layer 302. The operating system layer can interact with a hardware layer 304. Examples of hardware in the hardware layer can include storage media or storage (e.g., computer-readable storage media) 306, processor(s) 308, a display 310, and/or battery 312, among others. Storage 306 can include cache 314. Note that illustrated hardware components are not intended to be limiting and different device manifestations can have different hardware components, such as Wi-Fi circuitry, global navigation satellite systems (GNSS) circuitry (e.g. GPS circuitry) and/or cellular circuitry, among others. VDVSM component 210 can function in cooperation with application(s) layer 300 and/or operating system layer 302. For instance, the VDVSM component can be manifest as an application or an application part.

From one perspective, any of devices 118, computer 114, and/or device 202 can be thought of as a computer. Processor 308 can execute data in the form of computer-readable instructions to provide a functionality. Data, such as computer-readable instructions and/or user-related data, can be stored on storage 306, such as storage that can be internal or external to the computer. The storage can include any one or more of volatile or non-volatile memory, hard drives, flash storage devices, and/or optical storage devices (e.g., CDs, DVDs etc.), among others. As used herein, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some configurations, devices 118, computer 114, and/or device 202 can include a system on a chip (SOC) type design. In such a case, functionality provided by the computer can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Further examples of the delivery and/or presentation of the VDVSM 120 will now be described relative to FIG. 3. In some implementations, VDVSM service 104 can improve efficiency of media delivery given finite storage resources (e.g., storage 306) and/or finite network bandwidth resources in system 200. For example, the customization of media to preferences of both the visitors 106 and the venue 102 can lower incidences of incorrect media delivery. Incorrect media can refer to media that is not enjoyed by the visitors and/or the venue. Often the incorrect media will be "skipped" or otherwise interrupted. For instance, the venue may "skip" a song, or the visitor may request that the venue change the music video that is playing. The customization of the VDVSM can lead to a lower likelihood that certain media will be "skipped" or interrupted. In instances where the media, such as a song or music video is skipped, network bandwidth that was utilized to stream the skipped media and memory (e.g., cache) that was used to buffer the skipped media are wasted and as such these resources are not available for other uses. Further, skipping already delivered media can cost the venue money since they may be charged by the network provider for the data transmission. Further still, skipped media can result in buffering delays for the next song or music video and thus decrease visitor satisfaction. Thus, it is important from a technical standpoint and a venue/visitor satisfaction standpoint to accurately select media that satisfies both the venue and the visitors. As mentioned above and below, the present implementations can provide higher rates of satisfaction (from both the visitors and the venue) than existing technologies and as a result less media is skipped, thereby resulting in more efficient use of computing and network resources.

To summarize, VDVSM component 210 can determine that visitor 106 is at venue 102, in some implementations. The VDVSM component can use venue information 112 and visitor information 116 to generate VDVSM 120. In some cases, customization of media through VDVSM service 104 can improve the efficiency of system resources, such as decreasing the streaming and caching of media that is ultimately rejected by the venue and/or visitors and never utilized.

Example Process

Figure 4:
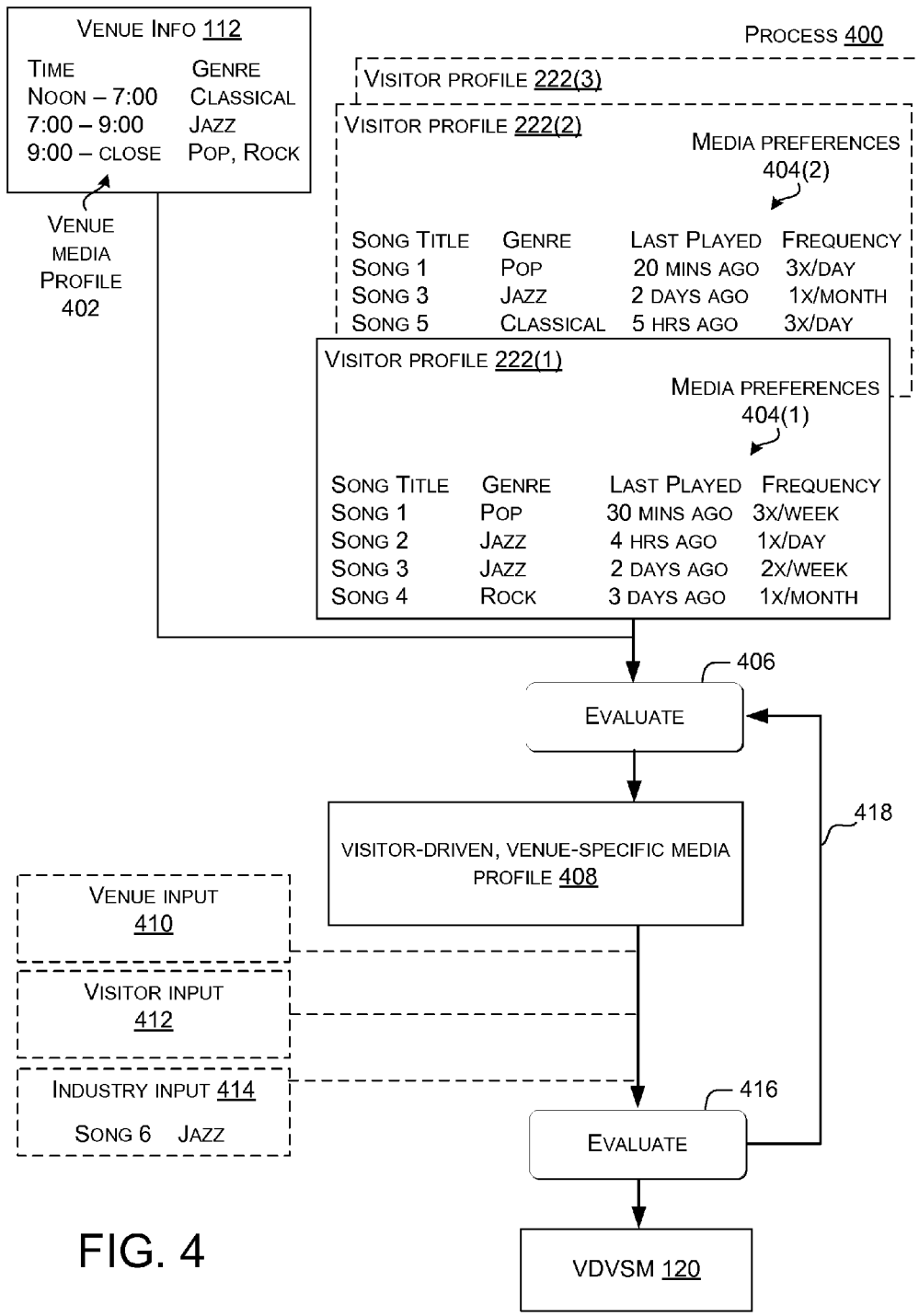
FIG. 4 shows an example process for visitor-driven, venue-specific media concepts in accordance with some implementations.

FIG. 4 illustrates an example process 400 for generating visitor-driven, venue-specific media (VDVSM). In some implementations, process 400 can be performed by VDVSM component 210 introduced in FIG. 2.

As illustrated in the example in FIG. 4, process 400 can consider the venue information 112 and the visitor profiles 222 introduced above relative to FIG. 2. In this example, the venue information can include venue media profile 402. Information included in the venue media profile can be thought of as parameters (e.g., venue parameters) and/or associated parameter values (e.g., venue parameter values). As shown in FIG. 4, the venue media profile can include a parameter "Time" that refers to a time period during the day, with parameter values such as "Noon-7:00." Also in this example, the venue media profile can include a parameter "Genre" that refers to a genre of music, with parameter values such as "Classical." In this example, the venue media profile indicates that classical music is to be played from noon until 7:00 o'clock in the evening.

In the example shown in FIG. 4, the visitor profiles 222 can include media preferences 404. Information included in the media preferences can be thought of as parameters (e.g., visitor parameters) and/or parameter values (e.g., visitor parameter values). The visitor profiles in the example in FIG. 4 include four parameters: Song Title, Genre, Last Played, and Frequency, arranged in columns. In this example, the four columns include several parameter values. In an example collectively illustrated in FIGS. 1, 2, and 4, media preferences 404(1) indicate that Song 1 is a pop music song, was last played by visitor 106(1) 30 minutes ago (e.g., on his/her device 118(1)), and the frequency that visitor 106(1) selects Song 1 is approximately three times per week. In this example, media preferences 404(2) also include Song 1; however, media preferences 404(2) indicate that Song 1 was last played by visitor 106(2) 20 minutes ago (e.g., on his/her device 118(2)), and the frequency that visitor 106(2) selects Song 1 is approximately three times per day. The example shown in FIG. 4 is not meant to be limiting; other examples of parameters, parameters values, and/or other information that could be included in venue information 112 and/or the visitor profiles have been described above, for example relative to FIG. 1. Stated another way, any information in the venue information and/or the visitor profiles can be thought of as parameters having parameter values that can be evaluated to formulate the VDVSM.

At block 406, process 400 can evaluate venue information 112 and/or visitor profiles 222. For example, process 400 can evaluate the parameters and/or parameter values from the venue information and/or the visitor profiles. The parameters and/or parameter values can be evaluated at block 406 in a variety of ways. For instance, the parameters and/or parameter values can be sorted, filtered, ranked, weighted, restricted, and/or otherwise evaluated. Several different examples of the evaluation at block 406 will now be described.

In some implementations, a goal of the evaluation at block 406 can be to find commonalities between the venue information 112 and/or the visitor profiles 222. For example, process 400 can examine the media preferences 404 of the visitor profiles to find songs in common between multiple visitor profiles. For instance, as shown in FIG. 4, visitor profile 222(1) and visitor profile 222(2) both include Song 1, a pop music song, and Song 3, a jazz song. For sake of brevity the media preferences are not shown for visitor profile 222(3). In this instance, process 400 could identify Song 1 and Song 3 as songs of high interest for the VDVSM since they are common to at least visitor profile 222(1) and visitor profile 222(2).

In some implementations, process 400 can further evaluate the parameters and/or parameter values of venue information 112 and/or visitor profiles 222 at block 406. For example, process 400 can filter the high interest (e.g., common) songs using the venue information. In this example, process 400 can determine that a current time is 8:00 o'clock in the evening. In this case, process 400 can use the venue media profile 402 and the current time to select Song 3, since Song 3 is common to at least two of the visitors and is the appropriate genre of music (jazz) for the current time. In this case, Song 1 is not selected since the genre (pop) of Song 1 does not satisfy the venue media profile for the current time.

In some implementations, at block 406, process 400 can compute a similarity between venue information 112 and visitor profiles 222. The similarity can be used to select media that is similar to the venue information and the visitor profiles. For example, a spectrogram can be generated and/or obtained for a song. The spectrogram can be a representation of a spectrum of frequencies in the song. At block 406, process 400 can obtain spectrograms for individual songs in the venue media profile and the visitor profiles. Process 400 can compute a similarity between the spectrograms of the venue media profile, between the spectrograms of an individual or multiple visitor profiles, and/or between the spectrograms of the venue media profile and the visitor profiles together, for example. Accordingly, process 400 can use the similarity to select songs that are similar to songs preferred by an individual or multiple visitors, songs that are similar to songs preferred by the venue, or songs that are similar to songs preferred by the visitors and venue together.

In some implementations, the songs in the visitor profiles 222 can be ranked by an order that they have been played, with more recent play time indicating higher preference. For example, process 400 can begin an evaluation of parameters and/or parameter values of venue information 112 and/or the visitor profiles by determining that the current time is 8:00 o'clock in the evening, and jazz music is appropriate according to the venue media profile 402. In this example, process 400 can filter the visitor profiles for jazz songs, resulting in a subset of parameter values including Song 2 and Song 3. In this case, process 400 can rank Song 2 and Song 3 by most recent play time. FIG. 4 shows that Song 2 was played four hours ago and Song 3 was played two days ago. Therefore, Song 2 can be ranked higher than Song 3 in a playlist. Note that in this case, Song 2 could be played at the venue since it is ranked higher in the playlist, while Song 3 might not actually be played, depending on the arrival and departure of various visitors contributing to the generation of the playlist. For example, visitor 106(2) could depart before Song 3 is queued to play from the playlist, and ranking of songs from other visitor profiles may supersede Song 3, such that Song 3 is not played.

In another example of evaluation of parameters and/or parameter values from venue information 112 and/or visitor profiles 222, process 400 can sort songs by how current the songs are. For instance, pop songs may have higher preference if they are currently popular (e.g., current hits). In another instance, how current the song is may not influence sorting/ranking of a genre such as classic rock. In yet another example of evaluation at block 406, songs can be sorted according to how often they are played by the visitor, with higher preference for songs that are played more often. Also, multiple sorting parameters can be used for sorting the information in the venue information and/or the visitor profiles. Thus, some implementations can dynamically weight the relative importance of individual parameters (e.g., the date a song was recorded is highly important in the pop music genre, but is of low importance in the classic rock genre). Toward this goal, such implementations can employ machine learning to determine relative weights of parameters in a given scenario and ultimately produce a ranked listing of media (e.g., songs) that satisfies the weighted parameters.

In a further example of parameter weighting, visitors themselves can be weighted relative to one another. For example, process 400 can weight the preferences of VIP visitors and/or more frequent visitors over other visitors (described above relative to the venue profile generator 212). For instance, another parameter (not shown) of the venue media profile 402 can indicate that visitor 106(1) is a member in a VIP club of venue 102, and visitor 106(2) is not a member of the VIP club. In this instance, parameter values from visitor profile 222(1) and visitor profile 222(2) may both be selected through the evaluation step at block 406. However, parameter values from visitor profile 222(1) can be weighted higher than parameter values from visitor profile 222(2) due to the membership of visitor 106(1) in the VIP club of the venue. In this case, songs from the visitor profiles of both visitors currently at the venue can be included in a playlist of the VDVSM 120; however, the songs from visitor profile 222(1) may be ranked higher in the playlist. Of course, in other cases process 400 can consider the preferences of the visitors equally (e.g., without weighting).

In another example of weighting, process 400 can give higher weight to venue information 112 than to an individual and/or combined visitor profiles 222. Furthermore, the venue information can trump (e.g., overrule) the visitor profiles. In some cases, process 400 can impose restrictions that may be indicated in the venue information, such as no songs with profanity in the lyrics, barring certain artists and/or individual songs, etc.

In yet another example of weighting, process 400 can weight parameters in venue information 112 and/or visitor profiles 222 for consistency of presentation of media. In this case, process 400 can preferentially play one genre of music rather than switching genres to satisfy conflicting visitor profiles. For instance, process 400 may determine that the current time is 10:00 o'clock at night, and both pop music and rock music genres are allowed as indicated by venue media profile 402 shown in FIG. 4. In this instance, by sorting the parameter values of the visitor profiles, process 400 finds Song 1 (pop) and Song 4 (rock). Process 400 may rank Song 1 higher due to parameters such as Song 1 being played more recently and more often than Song 4, and also being common to at least two visitor profiles. In this case, process 400 may search for additional pop songs in other visitor profiles, and may rank the additional pop songs higher than rock Song 4 to maintain the consistency of the presentation of the media. Note that in this case, although last play time and/or frequency of play were given higher weight in an initial ranking, the consistency of the presentation was given higher weight in further evaluation of the parameter values.

To summarize, some parameters may be weighted more than other parameters, and the relative weighting between parameters may change dynamically. In some cases, the weighting of the parameters described above can be combined using machine learning techniques. For example, the weighting of the parameters can be computed using decision trees, neural networks, multiple additive regression trees, etc.

Process 400 can use the evaluation at block 406 to create VDVSM profile 408. In some cases, the VDVSM profile can be the VDVSM 120 and/or be nearly equivalent to the VDVSM. For instance, the VDVSM profile can be an ordered/ranked list of songs that can be used as a playlist of the VDVSM. In other cases, process 400 can consider additional input before generating the VDVSM. For example, additional input can include venue input 410, visitor input 412, and/or industry input 414. The venue input can include elements of the venue information 112 introduced relative to FIG. 1. For instance, the venue input can include a communication from the venue 102 to skip a current song, to begin a special event, etc. The visitor input can include a current selection by visitor 106 on their own device 118. The visitor input can also include direct real-time input, such as the visitor choosing "like" or "dislike" on his/her device in response to a song or television station currently streaming at the venue. The industry input can include the request 128 introduced relative to FIG. 1.

At block 416, process 400 can evaluate VDVSM profile 408 in light of any venue input 410, visitor input 412, industry input 414, and/or other additional input to generate the VDVSM 120. In some implementations, process 400 can sort, filter, rank, weight, restrict, and/or otherwise evaluate the venue input, visitor input, industry input, and/or other additional input along with the VDVSM profile. For example, the VDVSM profile may include Song 2 and Song 3 from visitor profiles 222, both jazz songs. As shown in FIG. 4, process 400 can receive the industry input, which can include Song 6 and include an indication that Song 6 is a new jazz song that is similar to Song 2 and Song 3 (e.g. same artist, similar style, etc.). In this case, the industry input may also include an incentive that process 400 can evaluate at block 416. Evaluation of the incentive and the parameter values of the visitor profiles may cause process 400 to rank Song 6 below Song 2, but above Song 3 in the VDVSM. Stated another way, in one example, weighting of the incentive can be blended with weighting of how recent the song was played by the visitors (or some other parameter) to create a blended ranking, which can be reflected in the VDVSM.

In some implementations, process 400 can also design complex (e.g., multi-level) VDVSM. In one example of complex VDVSM, the VDVSM can include multiple playlists tailored to visitors 106 in different areas of the venue 102 (discussed above relative to FIG. 1). For example, at block 406, process 400 can evaluate a subset of visitor profiles 222 that corresponds to a subset of the visitors that are in an outdoor area (e.g., outdoor area 110 in FIG. 1). In general, different types of venue areas can include dining areas, bar areas, dance floors, inside space, outside spaces, restrooms, lounges, hallways, and/or elevators. In another example of complex VDVSM, process 400 can evaluate the visitor profiles to determine a combination of audio and visual content for the complex VDVSM. In this example, the complex VDVSM can include music for a sports bar-type venue and include sports broadcasting channels to display on screens within the sports bar-type venue.

At loop 418, process 400 can return to block 406 to reevaluate the venue information 112 and/or the visitor profiles 222. In some cases, process 400 can continually loop from block 416 to block 406. Returning to block 406 can allow process 400 to update VDVSM profile 408 in response to individual visitors arriving and/or departing from the venue. Loop 418 can also allow process 400 to update the VDVSM profile as the venue information changes. In the example shown in FIG. 4, loop 418 can allow process 400 to reevaluate the VDVSM profile after 7:00 o'clock in the evening, when the music genre in venue media profile 402 changes from classical to jazz. In this case, Songs 2 and/or 3 may be selected for the VDVSM profile, while Song 5 may no longer be selected.

To summarize, whenever visitors enter a venue, information about the venue and the visitors can be utilized to customize media for the venue. In this manner, not only does the venue provide the type of media that fits a desired vibe/ambience of the venue, but the venue also provides the exact media in which visitors currently at the venue are interested. The arrangement and/or order of elements shown in FIG. 4 are not meant to be limiting; other arrangements and/or orders of the elements are contemplated.

Method Examples

Figure 5:
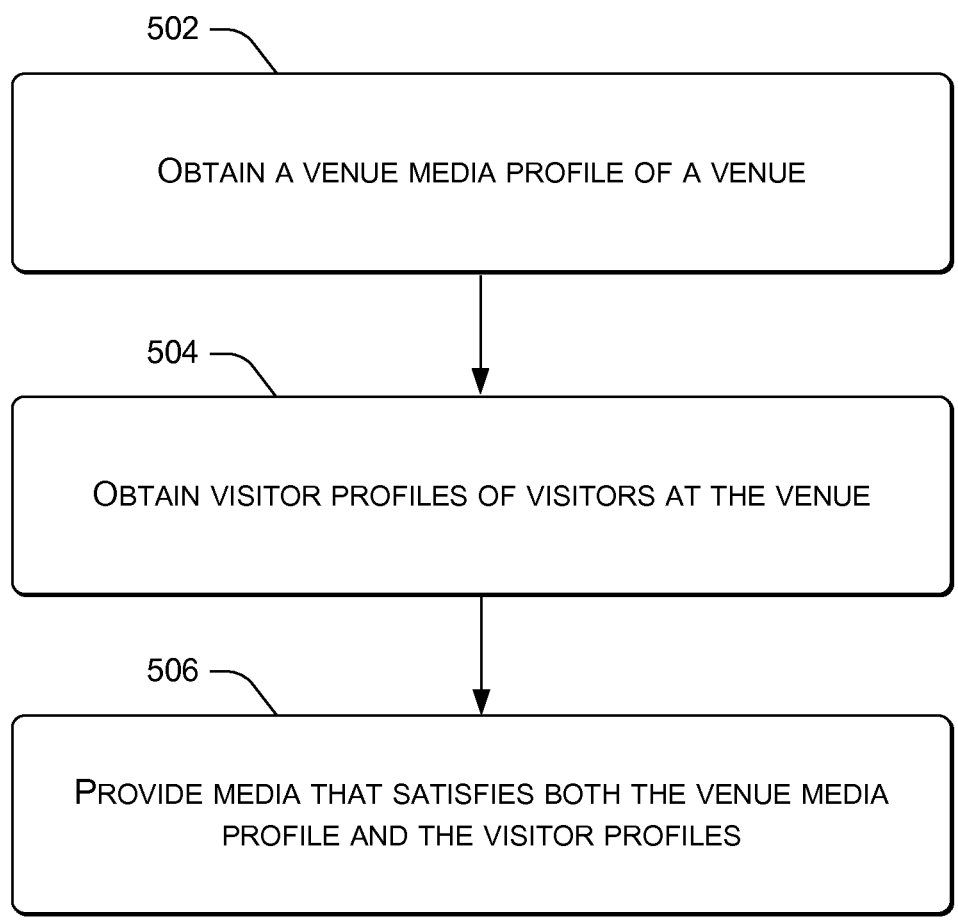
FIGS. 5-7 show example flowcharts for visitor-driven, venue-specific media concepts in accordance with some implementations.

FIG. 5 illustrates a first flowchart of a technique or method 500 for generating visitor-driven, venue-specific media (VDVSM).

At block 502, method 500 can obtain a venue media profile of a venue (e.g., venue 102 in FIG. 1). In some cases, the venue media profile can include a music genre specified by the venue. In other cases, the venue media profile can include a prepackaged media profile.

At block 504, method 500 can obtain visitor profiles of visitors (e.g., visitors 106 in FIG. 1) at the venue. In some cases, method 500 can obtain the visitor profiles from the visitors. In other cases, method 500 can recognize that the visitors are currently at the venue by the visitors logging on to a local network of the venue.

At block 506, method 500 can provide media (e.g., the VDVSM) that satisfies both the venue media profile and the visitor profiles. In some cases, method 500 can provide the media by determining commonalities between the venue media profile and the visitor profiles. In other cases, method 500 can provide the media by determining the commonalities among the visitor profiles and evaluating the commonalities using the venue media profile. Further, method 500 can generate a playlist including the commonalities. In some implementations, method 500 can evaluate a request from a media industry entity. In this case, the media provided by method 500 can include input from the media industry entity.

In some implementations, method 500 can determine that additional individual visitors have arrived at the venue. Method 500 can obtain additional visitor profiles for the additional visitors. Updated commonalities can be determined using the additional visitor profiles. The updated commonalities can be evaluated using the venue media profile. Method 500 can also provide updated media based on the updated commonalities and the venue media profile.

In some implementations, at block 506, method 500 can generate a playlist of the media. Method 500 can also retrieve the media from a media source, such as a media library. In some cases, method 500 can retrieve a portion of the media according to the venue media profile before retrieving a remainder of the media according to the playlist.

Figure 6:
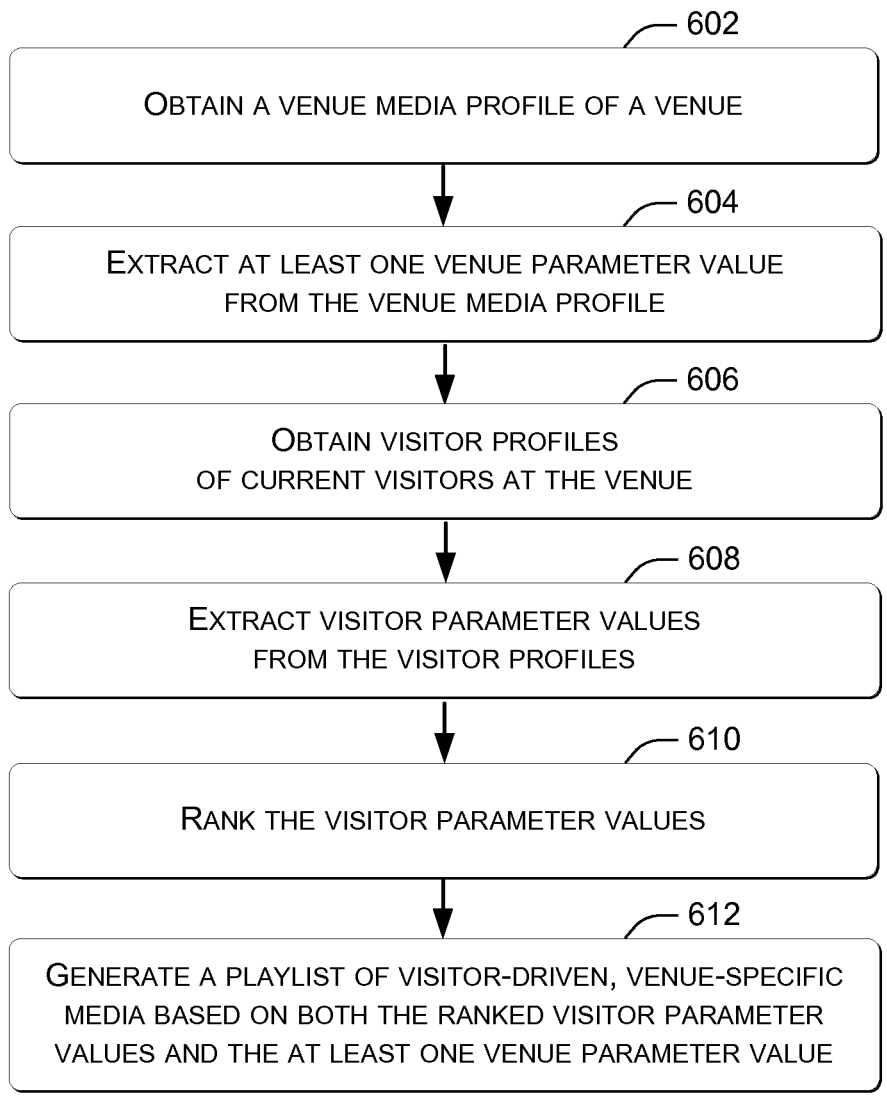

FIG. 6 illustrates a second flowchart of a technique or method 600 for generating the VDVSM.

At block 602, method 600 can obtain a venue media profile of a venue. At block 604, method 600 can extract at least one venue parameter value from the venue media profile. At block 606, method 600 can obtain visitor profiles of current visitors at the venue. At block 608, method 600 can extract visitor parameter values from the visitor profiles.

At block 610, method 600 can rank the visitor parameter values. In some cases, method 600 can rank the visitor parameter values by weighting the visitor parameter values according to an additional extracted venue parameter value.

At block 612, method 600 can generate a playlist of the VDVSM based on both the ranked visitor parameter values and the at least one venue parameter value. The VDVSM can include songs, videos, media stations, and/or other content.

In some cases, method 600 can generate the playlist by filtering the ranked visitor parameter values using the at least one venue parameter value. In other cases, method 600 can generate the playlist based on additional input from a media industry entity. In some implementations, method 600 can update the VDVSM in response to a change in individual visitors of the current visitors at the venue.

In some implementations, method 600 can control delivery and/or presentation of the VDVSM at the venue. For example, the playlist of VDVSM and/or the VDVSM can be streamed and/or stored at the venue. In some cases, method 600 can control the VDVSM being presented at the venue based on the VDVSM playlist. For instance, method 600 can control a sound system at the venue to play songs in a certain order as indicated by the VDVSM playlist.

Figure 7:
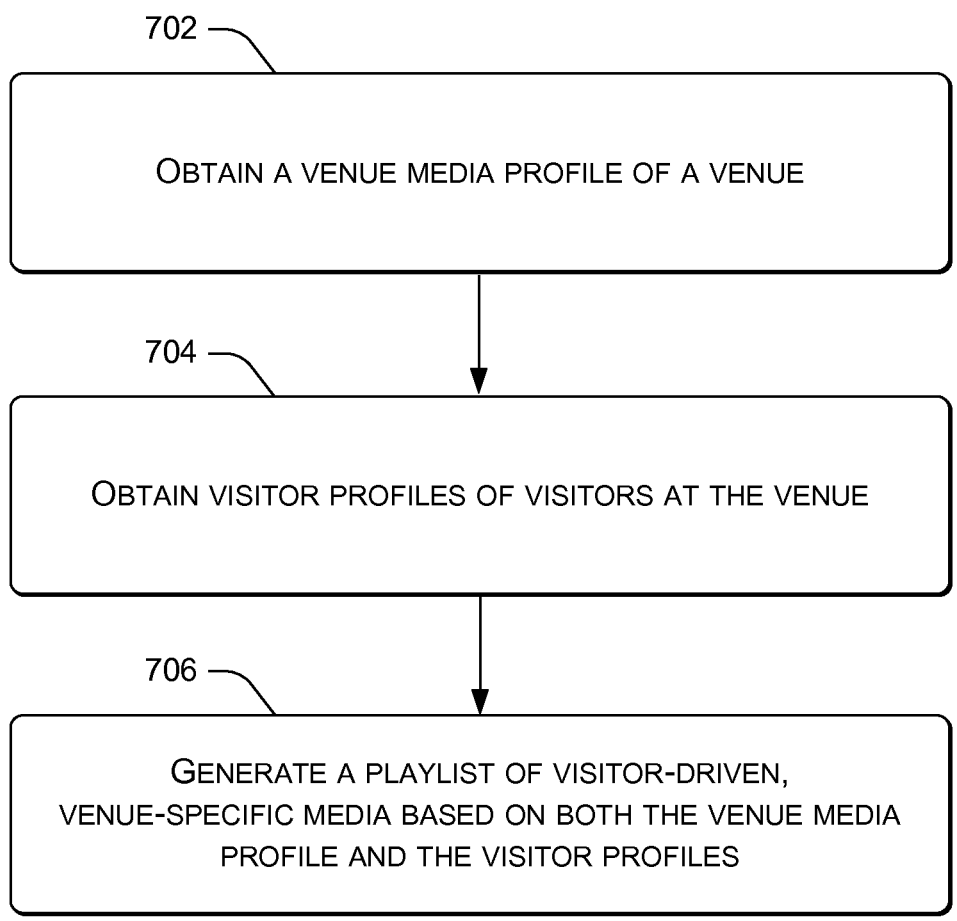

FIG. 7 illustrates a third flowchart of a technique or method 700 for generating a VDVSM playlist.

At block 702, method 700 can obtain a venue media profile of a venue (e.g., venue 102 in FIG. 1).

At block 704, method 700 can obtain visitor profiles of visitors (e.g., visitors 106 in FIG. 1) at the venue.

At block 706, method 700 can generate a playlist of VDVSM based on both the venue media profile and the visitor profiles. In some cases, method 700 can control a media delivery system at the venue (e.g., sound system speakers, displays). For example, method 700 can utilize the playlist of the VDVSM to control the media delivery system.

The described methods can be performed by the systems and/or devices described above relative to FIGS. 2-3, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

Additional Examples

Various examples are described above. Additional examples are described below. One example is manifest as a computing device that can perform acts comprising obtaining a venue media profile of a venue, extracting at least one venue parameter value from the venue media profile, obtaining visitor profiles of current visitors at the venue, extracting visitor parameter values from the visitor profiles, ranking the visitor parameter values, generating a playlist of visitor-driven, venue-specific media (VDVSM) based on both the ranked visitor parameter values and the at least one venue parameter value, and utilizing the playlist of the VDVSM to control a media delivery system at the venue. The example can include at least one computer-readable storage medium having instructions stored thereon that, when executed by the computing device, can cause the computing device to perform the acts.

Any combination of the above and/or below examples where the generating further comprises filtering the ranked visitor parameter values using the at least one venue parameter value.

Any combination of the above and/or below examples where the VDVSM includes songs, videos, media stations, and/or other content.

Any combination of the above and/or below examples further comprising updating the playlist of the VDVSM in response to a change in individual visitors of the current visitors at the venue.

Any combination of the above and/or below examples where the ranking the visitor parameter values comprises weighting the visitor parameter values according to an additional extracted venue parameter value.

Any combination of the above and/or below examples further comprising generating the playlist of the VDVSM based on additional input from a media industry entity.

Any combination of the above and/or below examples where the computing device is a cloud computing device.

Another example is manifest as a method, comprising obtaining a venue media profile of a venue, obtaining visitor profiles of visitors at the venue, and providing media that satisfies both the venue media profile and the visitor profiles. The example can be implemented on at least one computing device.

Any combination of the above and/or below examples where the obtaining the venue media profile, the obtaining the visitor profiles, and the providing are implemented on a single venue computing device.

Any combination of the above and/or below examples where the venue media profile includes a music genre specified by the venue or a prepackaged media profile.

Any combination of the above and/or below examples where the obtaining the visitor profiles further comprises obtaining the visitor profiles from the visitors.

Any combination of the above and/or below examples where the obtaining the visitor profiles further comprises recognizing that the visitors are currently at the venue by the visitors logging on to a local network of the venue.

Any combination of the above and/or below examples where the providing the media further comprises determining commonalities between the venue media profile and the visitor profiles and generating a playlist including the commonalities.

Any combination of the above and/or below examples where the obtaining the venue media profile, the obtaining the visitor profiles, and the providing are implemented on a cloud computing device.

Any combination of the above and/or below examples where the providing further comprises determining commonalities among the visitor profiles and evaluating the commonalities using the venue media profile.

Any combination of the above and/or below examples where the providing further comprises evaluating a request from a media industry entity, where the media includes input from the media industry entity.

Any combination of the above and/or below examples further comprising determining that additional individual visitors have arrived at the venue, obtaining additional visitor profiles for the additional visitors, determining updated commonalities using the additional visitor profiles, evaluating the updated commonalities using the venue media profile, and providing updated media based on the updated commonalities and the venue media profile.

Any combination of the above and/or below examples where the providing further comprises generating a playlist of the media and retrieving the media.

Any combination of the above and/or below examples where the providing further comprises retrieving a portion of the media according to the venue media profile before retrieving a remainder of the media according to the playlist.

Another example is manifest as a system, comprising a visitor-driven, venue-specific media (VDVSM) component configured to obtain a venue media profile of a venue, obtain visitor profiles of visitors at the venue, and generate a playlist of VDVSM based on both the venue media profile and the visitor profiles. The example can include one or more processing devices that execute computer-executable instructions associated with the VDVSM component.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
receiving specifications for a venue from a user;
building a venue media profile of the venue based at least in part on the specifications received from the user including specified media for the venue;
obtaining visitor profiles of visitors at the venue including preferred media of the visitors;
extracting visitor parameter values from the visitor profiles;
ranking the visitor parameter values such that more weight is assigned to media associated with a first visitor than to other media associated with a second visitor;
receiving a request from a media industry entity, the request including an incentive to include new media content in a media playlist for the venue;
creating a blended ranking of the venue media profile, the ranking of the visitor parameter values, and weighting of the incentive from the media industry entity;
based at least in part on the venue media profile and the blended ranking, arranging an order of the media playlist that includes at least some of the specified media for the venue, at least some of the preferred media of the visitors, and the new media content; and
providing selected media at the venue according to the media playlist,
wherein the providing is implemented on at least one computing device.

2. The method of claim 1, wherein the venue media profile includes at least one venue parameter value and creating the blended ranking comprises weighting the visitor parameter values and the at least one venue parameter value.

3. The method of claim 2, wherein the at least one venue parameter value is weighted greater than the visitor parameter values.

4. The method of claim 1, the method further comprising updating the blended ranking of the visitor parameter values and updating the order of the media playlist in response to a change in individual visitors of the visitors at the venue.

5. The method of claim 1, wherein the blended ranking comprises assigning more weight to media associated with a first visitor than to other media associated with a second visitor.

6. The method of claim 1, wherein the blended ranking considers how recently an individual song has been accessed by at least one of the visitors at the venue.

7. The method of claim 1, further comprising providing a graphical user interface to the media industry entity and receiving the request via the graphical user interface.

8. The method of claim 1, wherein the computing device is a cloud computing device.

9. A method, comprising:
receiving specifications for a venue from a user;
building a venue media profile of the venue based at least in part on the specifications received from the user including specified media for the venue;
obtaining visitor profiles of visitors at the venue including preferred media of the visitors;
extracting visitor parameter values from the visitor profiles;
sending at least a portion of the visitor parameter values to a media industry entity;
receiving a request from the media industry entity to include new media content in a media playlist, wherein the new media content is tailored to the portion of the visitor parameter values;
based at least in part on the venue media profile, the visitor parameter values, and the request from the media industry entity, arranging an order of the media playlist that includes at least some of the specified media for the venue, at least some of the preferred media of the visitors, and the new media content; and
providing selected media at the venue according to the media playlist,
wherein the providing is implemented on at least one computing device.

10. The method of claim 9, further comprising presenting a graphical user interface through which the media industry entity places the request.

11. The method of claim 9, wherein the providing the selected media further comprises:
determining commonalities between the specified media for the venue and the preferred media of the visitors, and
arranging the order of the media playlist by assigning greater weight to the commonalities.

12. The method of claim 9, wherein the building the venue media profile, the obtaining the visitor profiles, and the providing are implemented on the at least one computing device and wherein the at least one computing device is a cloud computing device.

13. The method of claim 9, wherein the arranging the order of the media playlist further comprises considering how often the preferred media of the visitors has been accessed by the visitors.

14. The method of claim 13, wherein the arranging the order of the media playlist further comprises considering a current popularity of the preferred media of the visitors.

15. The method of claim 13, further comprising:
determining that additional individual visitors have arrived at the venue; and
updating the order of the media playlist to include at least one new media item associated with the additional individual visitors.

16. The method of claim 9, wherein the providing further comprises generating the media playlist of the selected media and retrieving the selected media.

17. The method of claim 16, wherein the providing further comprises retrieving the specified media for the venue before retrieving a remainder of the selected media according to the media playlist.

18. A system, comprising:
a processor and storage; and
storage storing instructions which, when executed by the processor, cause the processor to:
obtain specifications for a venue from a user,
build a venue media profile of the venue based at least in part on the specifications received from the user,
obtain visitor profiles of visitors at the venue,
extract visitor parameter values from the visitor profiles,
send at least a portion of the visitor parameter values to a media industry entity,
receive a request from the media industry entity to include new media content in a media playlist, wherein the new media content is tailored to the portion of the visitor parameter values,
based at least in part on the venue media profile, the visitor parameter values, and the request from the media industry entity, arrange an order of the media playlist that includes the new media content, and
provide selected media at the venue according to the media playlist.

19. The system of claim 18, wherein the specifications received from the user comprise specified media for the venue and the selected media of the media playlist includes at least some of the specified media.

20. The system of claim 18, wherein the visitor profiles of visitors at the venue comprise preferred media of the visitors and the selected media of the media playlist includes at least some of the preferred media of the visitors.

* * * * *